Figure 1:
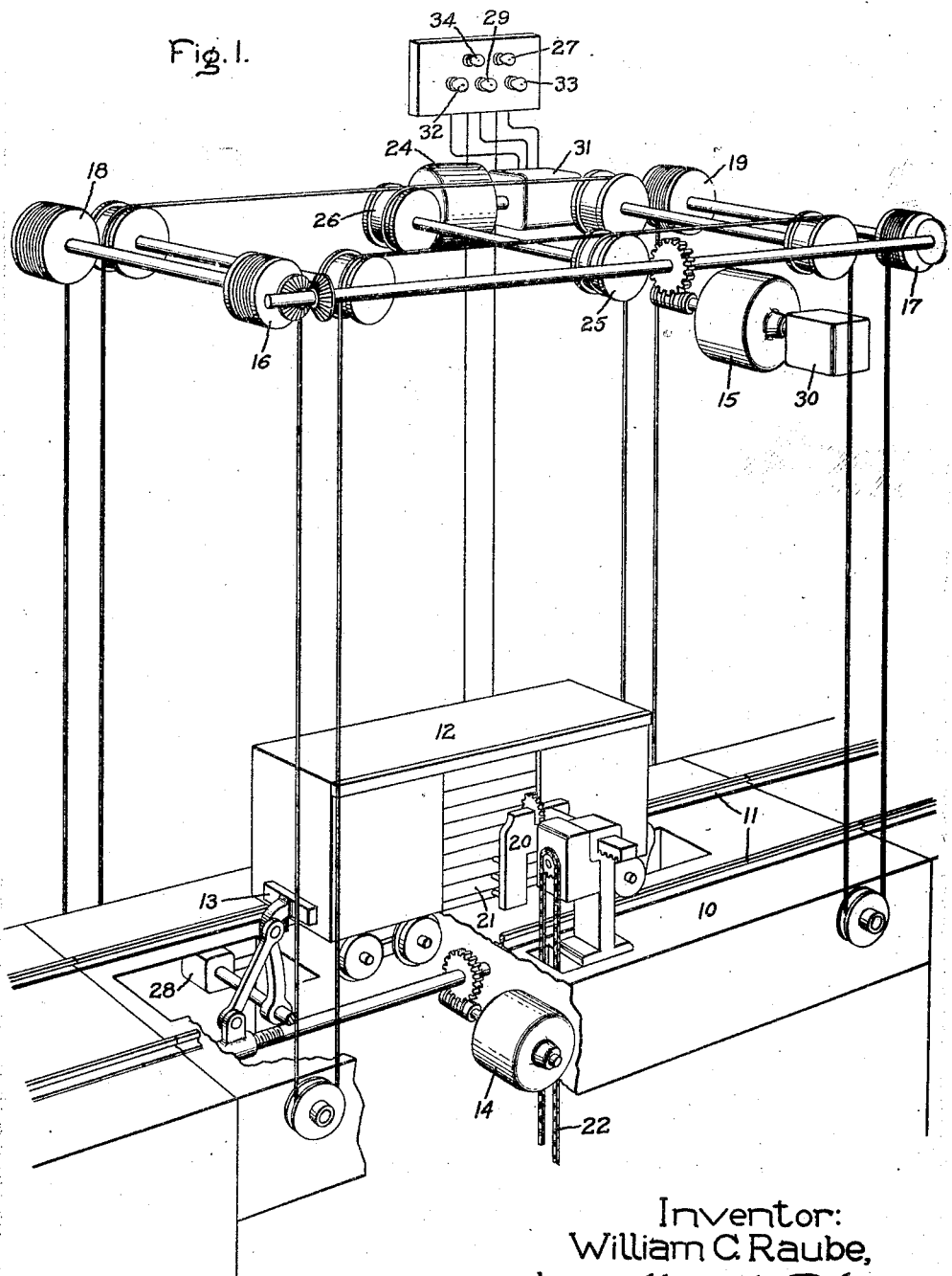

Feb. 9, 1926.

W. C. RAUBE 1,572,682

MOTOR CONTROL SYSTEM

Filed August 5, 1925  2 Sheets-Sheet 1

Inventor:
William C. Raube,
by *Alexander S. Smith*
His Attorney.

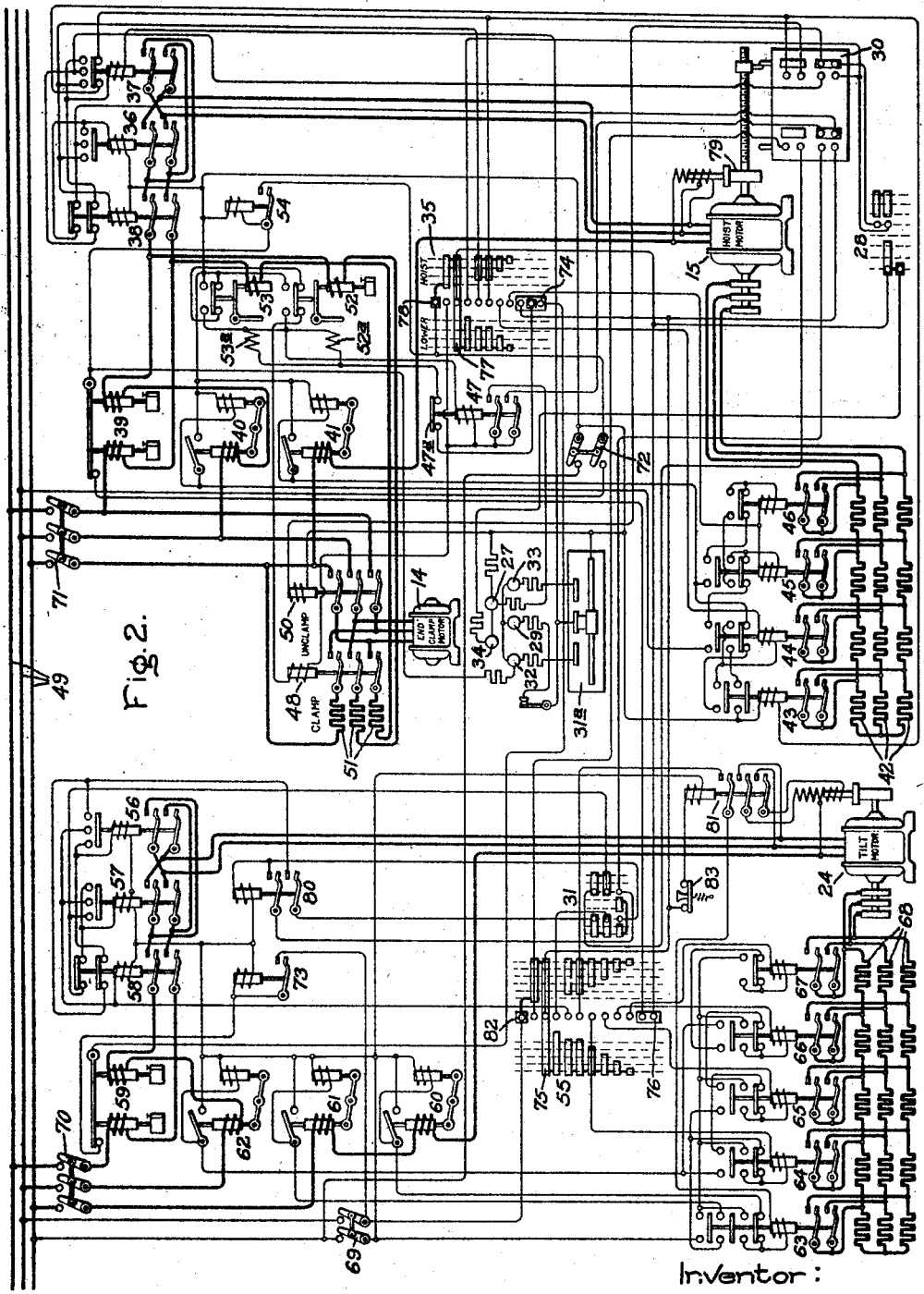

Patented Feb. 9, 1926.

1,572,682

UNITED STATES PATENT OFFICE.

WILLIAM C. RAUBE, OF SCHENECTADY, NEW YORK, ASSIGNOR TO GENERAL ELECTRIC COMPANY, A CORPORATION OF NEW YORK.

MOTOR-CONTROL SYSTEM.

Application filed August 5, 1925. Serial No. 48,379.

*To all whom it may concern:*

Be it known that I, WILLIAM C. RAUBE, a citizen of the United States, residing in the city of Schenectady, county of Schenectady, State of New York, have invented new and useful Improvements in Motor-Control Systems, of which the following is a specification.

My invention relates to improvements in systems of motor control and the invention is particularly applicable to the operation and control of apparatus for unloading cars of material, such as grain cars, and the like.

In accordance with the invention, the loaded car is run on an unloading platform, the car clamped in position thereon and then automatically hoisted and inclined to such a position that a device crushes in the car door and thus permits the grain or other material to spill into a hopper or other receptacle. When a certain amount of the material has spilled from the car, the car is tilted end for end back and forth so as to permit all of the material in the car to be emptied. After this operation, the car is levelled so that it is not tilted end for end, and the car is then lowered to the original position, after which the end clamps may be released and the car shoved off the unloading platform so that the platform is ready to receive another car to be unloaded. Suitable indicating devices are provided for insuring that the various operations are performed exactly as intended so that the operator may control the unloading of the car at a safe or convenient distance from the unloading platform. Various protective switches with their interconnections are provided so that improper or unsafe operation of the equipment is prevented.

In the accompanying drawings Fig. 1 illustrates a grain car unloader with a car clamp in position on the holding platform preparatory to being hoisted and tilted so as to spill the grain from the car. Fig. 2 is a diagram of the system of control for the motor which operates the end clamps for the car, the motor which hoists and lowers the platform on which the car is positioned, and the motor for tilting the platform and the car so as to permit the grain to spill from the car while in the elevated position.

Referring to the drawings, and in particular to Fig. 1, the grain car unloader therein shown comprises a platform 10 having stub rail sections 11 thereon, which when the platform is in the initial position, line up with the corresponding rails of a trackway system so that the car 12 may be run on the platform while the end clamps 13 are released. The platform is supported by the cables shown during hoisting and lowering and by platform supports (not shown) when the platform is in the position shown. The car is preferably spotted as nearly as possible to the mid position of the platform so that when the rail clamps 13 are operated by the motor 14, the car will be brought exactly to the mid position of the platform and securely held therein. The platform with the car thereon is hoisted to the spilling position by means of the electric motor 15. This hoisting and lowering motor operates the drums 16 and 17 located at the front of the platform and also the drums 18 and 19 located at the rear of the platform. The drums 16 and 17 are of smaller diameter than the drums 18 and 19 so that when the hoisting and lowering motor 15 is operated to raise the platform and car thereon, the platform and the car will be inclined toward the front so that the car door pusher 20 may crush in the door 21 of the car and thus permit the material in the car to spill therefrom.

The car door pusher is shown conventionally in the drawing and is represented as being operated by means of a chain 22 which through suitable gearing causes the pusher 20 to operate toward and from the car door. The particular details of construction of this car door pusher are not of the essence of my invention and this part of the construction has therefore been shown rather diagrammatically. It will be understood that as the platform is raised, the door pusher 20 will move toward the car door 21 and that as the platform is lowered the door pusher will move away from the car door.

The electric motor 24 is provided for tilting the platform with the car thereon end for end so as to permit all of the grain to spill from the car. With the car in the inclined position to which it is hoisted by the hoisting motor 15, only a portion of the grain will spill from the car. By tilting the car end for end while in this inclined position all of the material will be emptied from the car. The tilt motor is mechanically connected to the drums 25 and 26 and since the drum 25 is located intermediate between the hoisting drums 16 and 17 and the drum 26 is located intermediate between the hoisting drums 18 and 19, by rotating the drums 25 and 26, the platform with the car thereon will be tilted to the left or to the right, depending upon the direction of operation of the motor 24.

Very briefly stated, the operation is as follows: The end clamp motor 14 is first energized to operate the end clamps 13 and thus position the car 12 on the platform 10 and hold this car securely in position preparatory to being hoisted and inclined. The indicating lamp 27 is then lit so as to indicate to the operator that the clamps have completely closed. Through the operation of the limit switch 28 which is operated synchronously with the operation of the end clamps 13, the hoisting and lowering motor 15 is automatically energized so as to raise the platform with the car thereon. By reason of the arrangement of the hoisting drums 16 to 19 inclusive, the platform will be not only raised but inclined sufficiently toward the front so that the material can spill from the car after the car door pusher 20 has been operated in the manner previously briefly explained to crush in the car door. During this interval the indicating lamp 29 will be lit, thereby indicating to the operator that the car is in what will be termed for convenience of description the elevated inclined position. After the hoisting operation has proceeded to the determined limit, the hoist motor 15 is automatically deenergized through the operation of the limit switch 30 which is operated synchronously with the hoisting and lowering operations. It is now possible to energize the tilting motor 24 so that when so much of the material has spilled from the car as is possible in the elevated inclined position, the tilting motor 24 is then operated to first tilt the car and platform toward the right, thereby spilling the grain in the left hand end of the car. Afterwards the motor 24 may be reversed to tilt the car to the left, thereby spilling the material from the right end portion of the car. The car may be thus tilted back and forth until the grain has all spilled therefrom. When the car is tilted to the left to the final position, the limit switch 31 will operate to deenergize the tilting motor 24. When the car has been tilted to the right to the final position a limit switch 31 will deenergize the tilting motor 24. In order to return the car to the initial position, it is necessary that the car be in the elevated inclined position preliminary to lowering. The arrangement is such that the lights 29, 32, and 33 will be lit, depending upon the position of the car, so that when only the no-tilt lamp 29 is lit, the operator will understand that the car is in the proper position to be lowered. This is particularly desirable because of the fact that it is necessary to lower the car so as to land on all of the platform supports at about the same time. When the car and platform have been lowered to the initial position and the clamps 13 have been fully released the "unclamp" lamp 34 will be lit.

By means of protective switch mechanism and inter-connections between the controllers for the various motors, false operation of the equipment is inherently prevented. Thus, the hoisting motor will not be energized until after the clamping operation has been fully completed, the tilting operation can not be initiated until after the platform with the car thereon has been elevated and inclined to the final hoisted position, the hoisting and lowering motor can not be energized to lower the platform and car unless the platform and car are in the elevated inclined position, and the end clamp motor can not be energized to release the clamps until after the platform has been lowered exactly to the initial position. As will be pointed out particularly hereinafter, a common controller is provided for the end clamp motor and the hoist-and-lowering motor, and the arrangement is such that through the provision of switch mechanism and interconnections, the hoist motor is automatically energized after the clamping operation has been completed and the end clamp motor is automatically energized to release the clamps after the lowering operation has been completed.

With this general understanding of the broad features of the arrangement, a description will now be given of the details of the motor control system shown in Fig. 2 which provides means whereby the various protective features are obtained. It will be assumed that the operations begin with the car spotted on the platform ready to be clamped in position.

The control equipment for the hoisting and lowering motor 15 comprises a master controller 35, a pair of reversing contactors 36 and 37, a line contactor 38, the overload relays 39, the current limit acceleration relays 40 and 41, and the accelerating resistance 42 in the rotor or secondary circuit of the motor, this resistance being cut out of the rotor circuit section by section by the successively operative contactors 43, 44, 45, and 46. The transfer relay 47 is provided for closing the control circuits for the motor 15 after the end clamp motor 14 has operated to fully clamp the car in position on the platform.

The control equipment for the end clamp motor 14 comprises the controller 35 which serves as a common controller for the hoisting and lowering motor 15 and the end clamp motor 14, the directional contactor 48 for connecting the clamp motor to the supply circuit 49 to clamp the car in position on the platform, the directional contactor 50 for energizing the motor 14 to operate in the reverse direction and unclamp the clamps from the car. The resistance 51 is included in the motor primary circuit as a protective or buffer resistance so that when the motor has operated the clamps to the fully clamped position and the motor stalls, the current taken by the motor will be limited to such a value that the motor will not be injured. The relays 52 and 53 are included in the primary circuit of the motor 14 and through the operation of these relays, the hoist motor 15 is automatically energized to elevate the platform with the car when the end clamp motor 14 has stalled by reason of the fact that the clamps are in the fully clamped position. The relay 54 is a no-voltage protective relay for the customary purpose.

The control equipment for the tilting motor 24 comprises the master controller 55, the directional contactor 56 for energizing the motor 24 to tilt the car to the left, the directional contactor 57 for energizing the tilt motor to tilt the car to the right, the line contactor 58, the overload relays 59 and the current limit relays 60, 61, and 62 which automatically control the acceleration contactors 63, 64, 65, 66, and 67 to successively short circuit the resistance 68 in the rotor or secondary circuit of the motor 24.

As thus constructed and arranged and with the various parts in their respective positions shown in the drawing, the operation of my invention is as follows: When the disconnecting switches 69, 70, 71, and 72 operate, the no-voltage relays 54 and 73 close automatically since the tilt motor master switch 55 and the hoist motor master switch 35 are in their respective off positions.

When the disconnecting switches are closed, with the various parts in their respective positions shown on the drawing, the no-voltage relays 73 and 54 close with the tilt motor master switch 55 in the off position and the hoist motor master switch 35 in the off position. Relay 73 is energized through left hand blade of the control disconnecting switch 69, coil of relay, contact of gravity reset overload relay 59, lower off position segment 74 of hoist master switch 35, upper finger of this segment to segment 75 of tilt master switch 55, to right hand blade of control disconnecting switch 69. The relay 54 is energized through upper blade of control disconnecting switch 72, coil of relay, contact of gravity reset overload relay 39, lower off position segment 76 of tilt motor master switch 55, segment 77 of hoist motor master switch 35, upper off position segment 78 of hoist master to lower blade of control disconnecting switch 72. That requires that both the tilt motor master switch and the hoist motor master switch be in their off positions before the no-voltage relays can close to energize the various control circuits.

By moving the hoist motor master switch 35 to the first or second position hoist, the clamp contactor 48 is energized to close through upper blade of control disconnecting switch 72, normally closed contacts of current limit control relays 52 and 53, coil of contactor 48, upper right hand segment of hoist motor master switch 35, third segment 77 of this master switch, lower off position segment 76 of tilt motor master switch to the middle supply conductor.

The clamp motor has the permanent resistance 51 in its primary circuit so that when the clamps 13 are operated to the full clamped position, the control relays 52 and 53 function to deenergize clamp motor contactor 48 and energize relay 47 through a circuit from upper blade of control disconnecting switch 72, upper contacts of either or both of the control relays 52 and 53, coil of relay 47, upper right and next lower segments of hoist master switch 35, lower off position segment 76 of tilt motor master switch, contact of gravity reset overload relays 39, contact of no-voltage relay 54 to lower blade of control disconnecting switch 72. (The shunt holding coils 52$^a$ and 53$^a$ of relays 52 and 53 are energized to maintain upper control relay contacts closed until relay 47 closes, at which time they are deenergized by interlock 47$^a$ on relay 47 and the contacts of control relays 52 and 53 assume their normal position.) When car is thus clamped in central position on car platform, the circuit of "clamps closed" indicating lamp 27 is made through the upper contact of relay 47 so as to indicate to the operator that the car is centered and held on the platform.

The car is then hoisted and inclined toward the car door pusher while being hoisted. That is because the front hoisting drums are of smaller diameter than the rear drums, and since both sets of drums are driven from one motor at the same speed, the rear of the platform is inclined forward. Hoist contactor 36 is energized to close through a circuit from lower blade of control disconnecting switch 72, contacts of no-voltage relay, contacts of gravity reset overload relay 39, off position segment 76 of tilt motor master switch, feed segment 77 of hoist motor master switch 35, upper right segment of hoist master, lower contact of relay 47, lower right segment of limit switch 30, upper auxiliary switch of line contactor 38, coil of contactor 36 to upper blade of control disconnecting switch 72.

Closing of hoist contactor 36 energizes line contactor 38 through auxiliary switch of contactor 36 and same circuit previously traced, thus energizing hoist motor in the hoisting direction. The operator will retain the controller in the second position with all the rotor resistance 42 in circuit, or by moving to the third position he will cause motor to accelerate by closing of resistor contactor 43. The platform is raised slowly and when the door crusher has begun to crush in the car door, the operator will advance the controller to full running position. The resistor contactor 44 will close under the control of the current limit relay 41, contactor 45 under the control of relay 40, and then contactor 46 under conrol of relay 41. When the platform has been raised to the full upper position, the limit switch 30 will deenergize the hoist contactor 36 and the line contactor 38. The solenoid brake 79 is deenergized and sets. The grain is then spilled out of the car, and when no more can be spilled out with car in initial raised position the tilt motor is set in operation.

The hoist motor master switch must be in the off position since the feed circuit for the tilt motor master switch 55 is through the lower off position segment 74 of the hoist master 35. The limit switch 31 through its control of the relay 80 requires that the platform be first tilted to the right. When the tilt master 55 is moved to an operative tilt right position, the tilt right contactor 57 is energized through right hand blade of control disconnecting switch 69, contacts of no-voltage relay 73, contacts of gravity reset overload relays 59, lower off position segment 74 of hoist master 35, feed segment 75 of tilt master 55, upper right segment of master switch 55, upper left segment of limit switch 30, upper right hand segments of limit switch 31, upper auxiliary switch of line contactor 58, coil of tilt right contactor 57, to left hand blade of control disconnecting switch 69. The line contactor 58 is energized in a manner similar to that explained in connection with the line contactor 38. (The relay 80 can not be energized until the limit switch 31 has been moved to the full tilt right position and this relay must close before the tilt left contactor 56 can be energized to close.) The resistor contactor 63 closes under the control of the current limit relay 60, the contactor 64 under the control of relay 61, the contactor 65 under the control of relay 60, the contactor 66 under control of relay 61 and 67 under control of relay 60. (This is an old and well known accelerating scheme.)

The brake contactor 81 is energized with the tilt master 55 in the off position through the upper off position segment 82 and the push button 83. When the master switch 55 is in an operative position, this contactor 81 is energized through the feed segment 75 of the master switch 55.

The limit switch 31 also operates and deenergizes the tilt motor 24 by deenergizing contactor 57 and then contactor 58 is deenergized by the opening of contactor 57. Tilting to the left is then had when all the material has spilled out of the car which can spill out with the car in the tilted right position. In this position the relay 80 is energized through the circuit, left blade of control disconnecting switch 69, coil of relay 80, lower left segment of limit switch 31, lower left segment of limit switch 30, off position segment 74 of hoist master switch 35, contact of gravity reset overload relays 59, contact of no-voltage relay 73 to right hand blade of control disconnecting switch 69. When relay 80 closes, it makes a holding circuit for itself through its upper contacts independent of the limit switch 31 so that the platform may be tilted back and forth at the will of the operator. With the tilt master 55 moved into a tilt left position, for example, the full running position, the tilt left contactor 56 is energized through the circuit, left hand blade of disconnecting switch 69, coil of contactor 56, lower auxiliary switch of contactor 58, lower contacts of relay 80, upper left segments of limit switch 31, and through feed segment 75 of tilt master 55 to right hand blade of control disconnecting switch 69, through a circuit previously traced. Tilting to left is arrested when the limit switch 31 moves to the full left position.

When the grain has been emptied from the car, it is first necessary to level the car and platform before lowering the same to the initial position. This is necessary in order to insure that the stub rails of the platform will line up exactly with the rails leading up to the platform, and to facilitate this leveling action, the indicating lamps 32, 29, and 33 have been provided. It will be remembered that these indicating lamps are under the control of the limit switch 31ª which is operated in response to the operation of the tilting motor 24. These lamps will preferably be of different colors so that the operator can tell at a glance the tilt of the platform and thereby operate the tilting motor accordingly to level the platform. Thus, for instance, the no-tilt lamp 29 may give a white light, the tilt to the left lamp 32 may give a red light, and the tilt to the right lamp 33 may give a green light. As will be observed, the movable contact of the limit switch 31ª is such that two stationary contacts may be bridged simultaneously, so that in case the platform is tilted considerably to the left, only the lamp 32 will be lit, and if only partly to the left, the lamps 32 and 29 will both be lit, whereas in case the platform is tilted considerably to the right, only the lamp 33 will be lit, and if only partly to the right, the lamps 29 and 33 will be lit. This indicates to the operator not only the direction of the tilt, but somewhat of the extent thereof.

As a further aid to the accurate leveling of the platform, the push button switch 83 has been provided and this push button may be arranged to be operated in any convenient way, as for example by the foot of the operator. When this push button is depressed, the brake contactor 81 is deenergized, thereby not only deenergizing the solenoid brake of the tilting motor 24, but also deenergizing the resistance contactors 63 to 67 since the energizing circuit of these contactors is through the upper contact of the contactor 81. Since the resistance 68 is thus reinserted in the secondary of the motor 24 and the electromagnetic brake is also applied thereto, an artificial loading of the tilt motor is had and this artificial loading is independent of the load represented by the car and the platform. The speed of the tilt motor is thus very materially reduced and the leveling operation is rendered very much easier so that the operator can spot the exact level position. In leveling the platform, the operator will watch the indicating lamps 32, 29, and 33 and when the particular tilt lamp is extinguished, he will appreciate that the leveling operation is approaching the desired position. At this time he will depress the push button 83 and reduce the speed of the motor so that when only the no-tilt lamp 29 is lit he will return the controller 55 to the off position quickly and prevent the platform overrunning the desired position. When the power to the motor 24 is thus cut off, the platform will stop practically instantly, since the solenoid brakes are already set and since the speed of the driving motor is so low that the inertia of the motor and the platform is at a minimum.

With the platform in the level position and the tilting master switch 55 in the off position, the master switch 35 for the motor 15 is now rendered effective to cause the motor 15 to lower the platform. As will be readily understood, the inclination of the car and the platform will gradually be reduced as the platform is lowered so that the platform will be brought exactly to the position indicated in Fig. 1. When the platform starts to lower, the relay 80 associated with the tilt motor control will be deenergized through the operation of the limit switch 30, the lower left hand segment of which is in the control circuit of the coil of the relay 80. This prevents any operation of the tilt motor during the lowering of the platform.

As the platform approaches the lower limit, the upper right hand segment of the limit switch 30 will break engagement with its cooperating contacts and thus deenergize the resistor contactors 43, 44, 45, and 46 and cause the resistance 42 to be inserted in the secondary of the motor 15. This will effect a reduction in the speed of the motor 15 and insure a gentle landing of the platform on the platform supports. When the plaform reaches the limit of travel the lower left hand contacts of the lower right hand segment of the limit switch 30 will have the circuit therethrough opened and the energizing circuit for the lowering contact 37 is thus opened, deenergizing the motor 15 and applying the solenoid brake 79. A control circuit for the unclamp contactor 50 is also established through the lower right hand segment of the limit switch 30 and the limit switch 28 so that the end clamp motor 14 is thus automatically energized to release the clamps. When the clamps have been fully released, the circuit for the contactor 50 will be opened by the operation of the limit switch 28 which is arranged to be operated in response to the operation of the end clamp motor. A circuit for the clamps upon lamp 34 is also established through the left hand segment of the limit switch 28, thus indicating to the operator that the unclamping operation has been fully completed and that the car is ready to be run off the platform. The hoist master switch 35 is then returned to the off position, and in moving this master switch to the off position the operator should hesitate an instant with the handle of the master switch midway between the first position and the off position, so as to reëstablish an energizing circuit for the control relay 47, since this relay had previously opened when the hoist master switch 35 had been previously returned to the off position preparatory to operaing the tilting motor.

The various parts are now in their respective positions indicated in Fig. 2, and the cycle may be repeated after the unloaded car has been shoved off of the platform and a loaded car shoved thereon.

What I claim as new and desire to secure by Letters Patent of the United States, is:—

1. In a system of control for effecting the unloading of a carrier, a motor for clamping the carrier in position to be hoisted, a motor for hoisting the carrier to permit the material to spill from the carrier, a common controller for said motors, and means comprising switch mechanism and connections cooperating with said controller whereby operating said controller effects the energization of the clamp motor until the clamping operation is completed and then the automatic energization of the hoist motor.

2. In a system of control for unloading a carrier, a motor for clamping the carrier in position to be hoisted and held in the hoisted position, a motor for hoisting the carrier to permit the material to spill therefrom and for lowering the carrier to the initial position, a common controller for said motors, and means comprising switch mechanism and connections cooperating with said controller whereby operating the controller effects the energization of the hoist motor in the lowering direction until the car is lowered to the initial position and then the automatic deenergization of the hoist motor and the automatic energization of the clamp motor to unclamp the carrier.

3. In a system of control for unloading a carrier, a motor for clamping the carrier in position to be hoisted, a normally applied brake for said motor, a motor for hoisting the carrier to permit the material to spill from the carrier, a normally applied brake for said hoisting motor, a common controller for said motors and brakes and means comprising switch mechanism and connections cooperating with said controller whereby operation of the controller effects the energization of said clamp motor and the release of the clamp motor brake until the clamping operation is completed and the clamp motor stalls, whereupon the clamp motor is automatically deenergized, the clamp motor brake is applied, and the hoisting motor is energized and the hoisting motor brake is released to elevate the carrier.

4. In a system of control for unloading a carrier, a motor for hoisting the carrier from the initial position to permit the material to spill therefrom and for then lowering the carrier to the initial position, a motor for clamping the carrier in position during spilling operations, a common controller for said motors, and means comprising switch mechanism and connections cooperating with said controller whereby initial operation of the controller effects the energization of said clamp motor and then the automatic deenergization thereof and the automatic energization of the hoist motor when the clamping operation is completed, and subsequent operation of said controller effects the energization of said hoist motor to return the carrier to initial position and the hoist motor is automatically deenergized and the clamp motor automatically energized when the carrier is returned to the initial position.

5. In a system of control for unloading a carrier, a motor for hoisting the carrier from an initial position to a spilling position and back to the initial position, a motor for clamping the carrier in position during spilling operations, a common controller for said motors, a tilting motor, a controller therefor, and switch mechanism and connections cooperating with said controllers whereby the tilting motor controller must be in a predetermined position to render the said common controller effective to control said hoist and clamp motors, and the said common controller must be in the off position and the carrier in the spilling position to render said tilting motor effective to control the tilting motor.

6. In a system of electric control for unloading a carrier, a reversible motor for tilting the carrier back and forth to permit material to spill from the carrier, a remote control for said motor comprising a controller together with switch mechanism and connections cooperating with the controller for energizing said motor for operation of the carrier in each direction from a neutral position until a limit has been reached and then automatically deenergizing the motor and requiring that the next operation of the carrier by the motor be in the reverse direction, and indicating means mechanically independent of the carrier and electrically connected to be controlled in response to movements of the carrier for indicating at a distance from the carrier the direction and extent of movement of the carrier from said neutral position.

7. In a system of electrical control for unloading a carrier, a reversible electric motor for tilting the carrier, speed controlling means therefor, a normally applied electromagnetic brake for said motor connected to be energized to release upon the energization of the motor, a reversing controller together with switch mechanism and electrical connections cooperating therewith for energizing said motor to tilt said carrier through a predetermined angle in each direction from a neutral position to permit the material to spill from the carrier, and an independently operable controller for said brake and said speed controlling means for applying the brake to reduce the speed of the motor by reason of the increased load on the motor due to said brake and by reason of the speed reducing effect of said speed controlling means to effect a slow speed return of said carrier by said motor exactly to said neutral position.

In witness whereof, I have hereunto set my hand this 4th day of August, 1925.

WILLIAM C. RAUBE.